(12) United States Patent
Lee (10) Patent No.: US 11,878,803 B2
(45) Date of Patent: Jan. 23, 2024

(54) UNMANNED AERIAL VEHICLE WITH CLOTH PART DEPLOYMENT SYSTEM

(71) Applicant: Rakuten Group, Inc., Tokyo (JP)

(72) Inventor: Kenichi Lee, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 505 days.

(21) Appl. No.: 17/059,324

(22) PCT Filed: Jul. 29, 2019

(86) PCT No.: PCT/JP2019/029701
§ 371 (c)(1),
(2) Date: Nov. 27, 2020

(87) PCT Pub. No.: WO2021/019655
PCT Pub. Date: Feb. 4, 2021

(65) Prior Publication Data
US 2021/0261249 A1 Aug. 26, 2021

(51) Int. Cl.
| B64D 19/00 | (2006.01) |
| B64D 17/80 | (2006.01) |
| B64U 30/20 | (2023.01) |
| B64U 10/14 | (2023.01) |

(52) U.S. Cl.
CPC ............. *B64D 19/00* (2013.01); *B64D 17/80* (2013.01); *B64U 10/14* (2023.01); *B64U 30/20* (2023.01)

(58) Field of Classification Search
CPC ........ B64D 17/80; B64D 17/62; B64D 19/00; B64U 30/20; B64U 30/29
See application file for complete search history.

(56) References Cited

U.S. PATENT DOCUMENTS

| 9,613,539 B1 * | 4/2017 | Lindskog ............. G08G 5/0069 |
| 10,096,255 B1 | 10/2018 | Lindskog et al. |
| 2020/0198790 A1 | 6/2020 | Yagihashi et al. |

FOREIGN PATENT DOCUMENTS

| JP | 2019-026236 A | 2/2019 |
| WO | 2017/086234 A1 | 5/2017 |
| WO | 2017/207570 A1 | 12/2017 |
| WO | 2019/039062 A1 | 2/2019 |

OTHER PUBLICATIONS

Japanese Office Action of JP2020-528066 dated Jun. 9, 2020.
Japanese Decision to Grant a Patent of JP2020-528066 dated Jun. 9, 2020.
International Search Report of PCT/JP2019/029701 dated Oct. 1, 2019 [PCT/ISA/210].
Written Opinion of PCT/JP2019/029701 dated Oct. 1, 2019 [PCT/ISA/237].

* cited by examiner

*Primary Examiner* — Joshua J Michener
*Assistant Examiner* — Arfan Y. Sinaki
(74) *Attorney, Agent, or Firm* — Sughrue Mion, PLLC (57) ABSTRACT

An unmanned aerial vehicle according to the present invention include: a main body; plural arms as supports that extend from the main body and support rotors; cloth-like parts held in a standby state in which the cloth-like parts are folded at positions close to the main body; and deployment mechanisms that are provided in the arms and each configured to move a portion of the cloth-like part in a direction away from the main body so that the cloth-like part-is switched from the standby state to a deployed state in which the cloth-like part is spread between the arms in plan view.

5 Claims, 8 Drawing Sheets

UNMANNED AERIAL VEHICLE WITH CLOTH PART DEPLOYMENT SYSTEM

CROSS REFERENCE TO RELATED APPLICATIONS

This application is a National Stage of International Application No. PCT/JP2019/029701 filed on Jul. 29, 2019.

TECHNICAL FIELD

The present invention relates to an unmanned aerial vehicle.

BACKGROUND ART

When a rotor in an unmanned aerial vehicle malfunctions or stops working, a known conventional technique allows a parachute to be deployed so that the unmanned vehicle can fall at a reduced speed. For example, Patent Document 1 discloses such a technique. Patent Document 1 discloses an unmanned aerial vehicle configured to stop plural rotors and deploy a parachute from an ejection mechanism when detecting its collision with an obstacle.

Patent Document 1: PCT International Publication No. WO 2017/086234

DISCLOSURE OF THE INVENTION

Problems to be Solved by the Invention

The parachute is useful to reduce the fall speed. However, the deployed parachute may get caught on a tree or a tall building. There is still room for improvement to reduce the risk of accidental contact during the falling.

An object of the present invention, which has been made under such circumstances, is to provide an unmanned aerial vehicle that can fall at a reduced speed with a reduced risk of accidental contact with a building or other object even when its rotor stops working.

Means for Solving the Problems

An aspect of the present invention is directed to an unmanned aerial vehicle including: a main body; plural supports, each support extending from the main body and supporting a rotor; a cloth-like part held in a standby state in which the cloth-like part is folded at a position close to the main body; and at least one deployment mechanism that is provided in the support and configured to move a portion of the cloth-like part in a direction away from the main body so that the cloth-like part is switched from the standby state to a deployed state in which the cloth-like part is spread between the supports in plan view.

Effects of the Invention

The present invention makes it possible to provide an unmanned aerial vehicle that can fall at a reduced speed with a reduced risk of accidental contact with a building or other object even when its rotor stops working.

PREFERRED MODE FOR CARRYING OUT THE INVENTION

Figure 1:
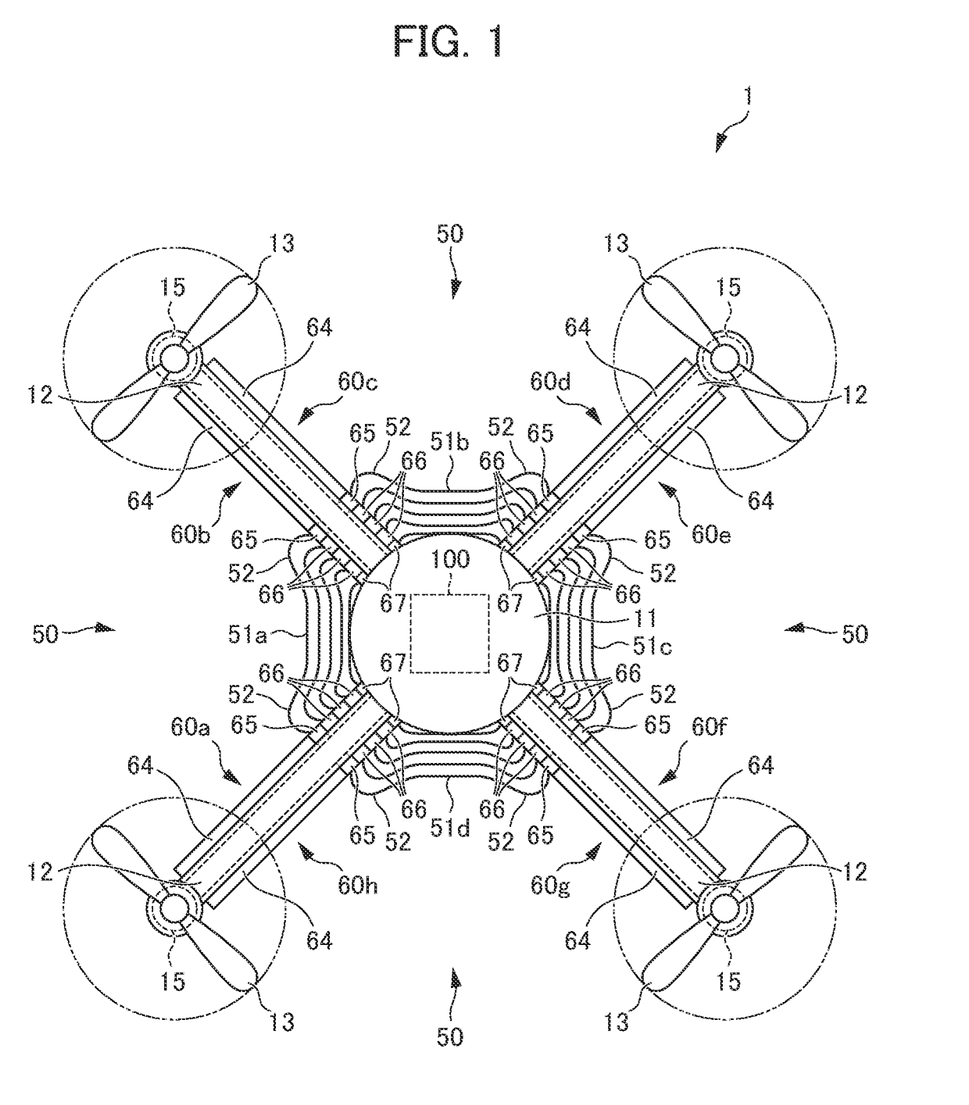
FIG. 1 is a plan view showing an unmanned aerial vehicle according to an embodiment of the present invention.

Hereinafter, non-limiting exemplary embodiments of the present invention will be described with reference to the drawings. FIG. 1 is a plan view showing an unmanned aerial vehicle 1 according to an embodiment of the present invention.

The unmanned aerial vehicle 1 shown in FIG. 1 is a vehicle that is capable of flying in an unmanned manner, known as a drone. The term "capable of flying in an unmanned manner" means the ability to fly with no human pilot on board and is intended to cover not only autonomous flying vehicles but also human remote-controlled unmanned flying vehicles.

The unmanned aerial vehicle 1 includes a main body 11, arms 12 as supports extending from the main body 11, rotors 13 supported by the arms 12, and a sail deployment system 50 that operates in an emergency, etc.

The main body 11 is located at a center of the unmanned aerial vehicle 1 in plan view and equipped with a controller 100 and electronic devices such as sensors including a camera (e.g., a computer including a CPU, a memory, and other components and configured to execute a control program).

The arm 12 is a support having one end connected to the main body 11 and the other end (hereinafter referred to as the "distal end") provided with the rotor 13. In this embodiment, four (plural) arms 12 extend radially (in radial directions) from the main body 11 in plan view. The four arms 12 are spaced at equal intervals along the circumferential direction in plan view.

The rotor 13 is supported on the main body 11 through the arm 12. Specifically, the rotor 13 is rotatably disposed on an upper surface of the distal end of the arm 12. A rotor motor 15 connected to the rotor 13 is built in the distal end of the arm 12. As the rotor motor 15 rotates, the rotor 13 is rotated to produce a lift force that enables the unmanned aerial vehicle 1 to fly.

The sail deployment system 50 includes cloth-like parts 51a to 51d that function as sails and deployment mechanisms 60a to 60h that function as drive units to switch the cloth-like parts 51 from a standby state to a deployed state.

The cloth-like parts 51a to 51d will be described. During normal flight, the cloth-like parts 51a to 51d are in a standby state in which they are folded at positions close to the main body 11.

The standby state will be described. The cloth-like part 51 is made of a material whose area in plan view can be made smaller in the standby state than in the deployed state.

The cloth-like parts 51a to 51d are creased so that they can be folded in a corrugated fashion in the standby state. In the standby state, the folded cloth-like part 51 has bent portions 52 at both distal ends, which are formed by folding an end portion of the cloth-like part 51. The bent portions 52 leave margins for the distal side length of the cloth-like part 51 in the deployed state.

The cloth-like parts 51a to 51d may be made of a stretchable elastic thin film material, a fiber cloth, a nonwoven fabric, a plastic material having an air-fillable layer, or any other appropriate material. In this embodiment, the cloth-like parts 51a to 51d may not have creases or the bent portions 52 depending on the elasticity of the material of the cloth-like parts 51a to 51d, how to crease, or how to stand by. Therefore, the standby state may be achieved using any propriate material and method as long as the cloth-like part 51 can be made smaller in the standby state than in the deployed state.

Figure 2:
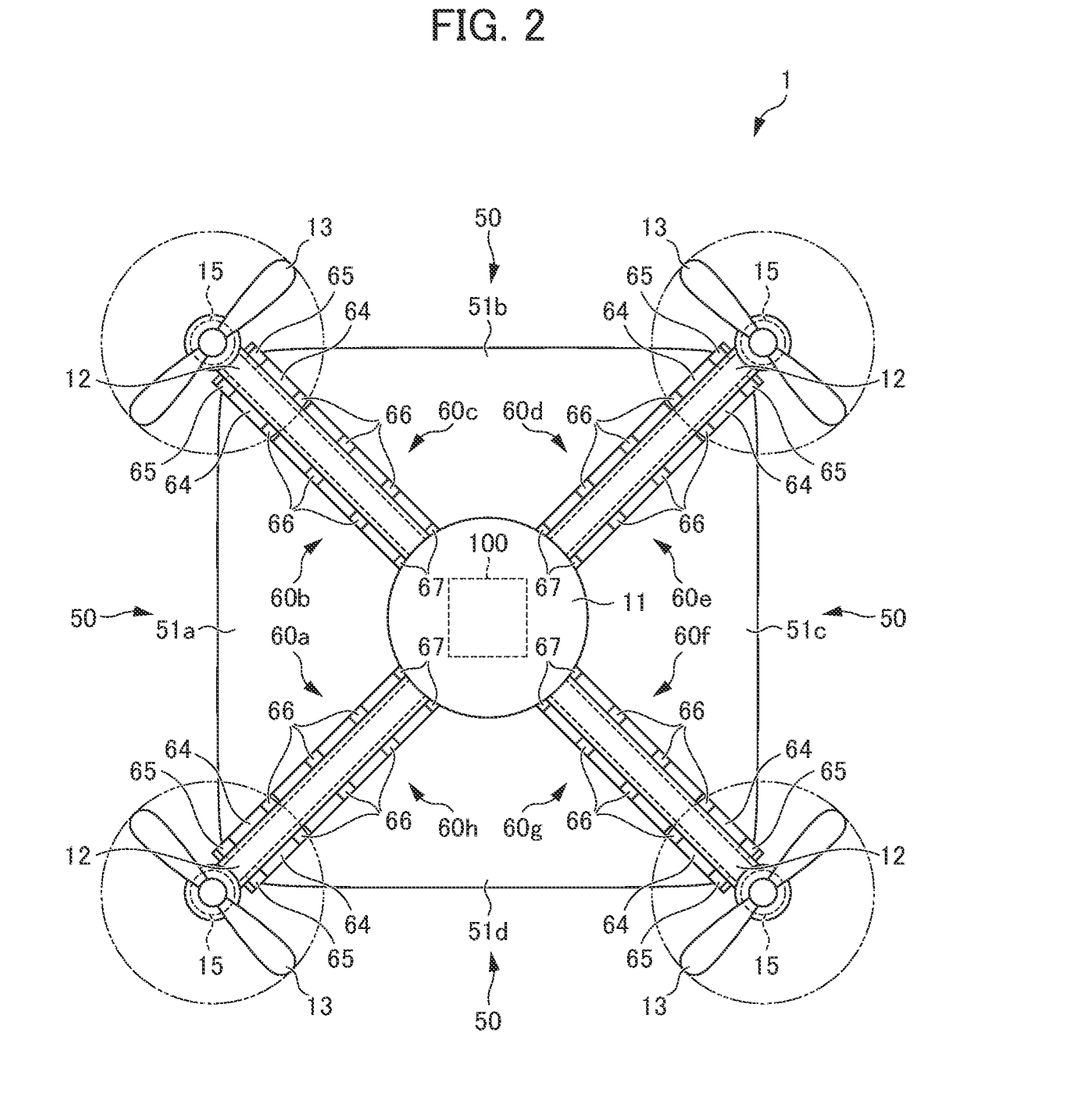
FIG. 2 is a plan view showing the unmanned aerial vehicle according to an embodiment with cloth-like parts in a deployed state.

On the other hand, in the deployed state shown in FIG. 2, the circumferential space is filled between the arms 12 in plan view. The cloth-like parts 51a to 51d are each deployed by means of a pair of two of the deployment mechanisms 60a to 60h located on both sides of each of the cloth-like parts 51a to 51d. In this regard, the term "deployed state" refers to any state in which, in plan view, the area of the cloth-like part 51 between the arms 12 is larger than that in the standby state. The spaces between the arms 12 arranged in the circumferential direction are filled by the cloth-like parts 51a to 51d in the deployed state. In this embodiment, the deployed state is intended to include not only a state in which the spaces between the arms 12 are entirely filled over the circumferential direction but also a state in which a space remains between the arms 12 and the cloth-like parts 51a to 51d.

Referring to FIGS. 1 and 2 with alphanumeric characters assigned in clockwise order, the cloth-like part 51a is driven by a pair of the deployment mechanisms 60a and 60b. Similarly, the cloth-like part 51b is driven by a pair of the deployment mechanisms 60c and 60d, the cloth-like part 51c is driven by a pair of the deployment mechanisms 60e and 60f, and the cloth-like part 51d is driven by a pair of the deployment mechanisms 60g and 60h. In this embodiment, two of the deployment mechanisms 60 handle one cloth-like part 51. Therefore, the four cloth-like parts 51a to 51d are handled by eight deployment mechanisms 60a to 60h.

The deployment mechanisms 60a to 60h have the same structure. The cloth-like parts 51a to 51d have the same shape and are made of the same material. Next, the configuration of the deployment mechanisms 60a to 60h will be described. In the description below of the common features of the deployment mechanisms 60a to 60h and the cloth-like parts 51a to 51d, the alphabetic characters will be omitted from the reference signs.

Figure 3:
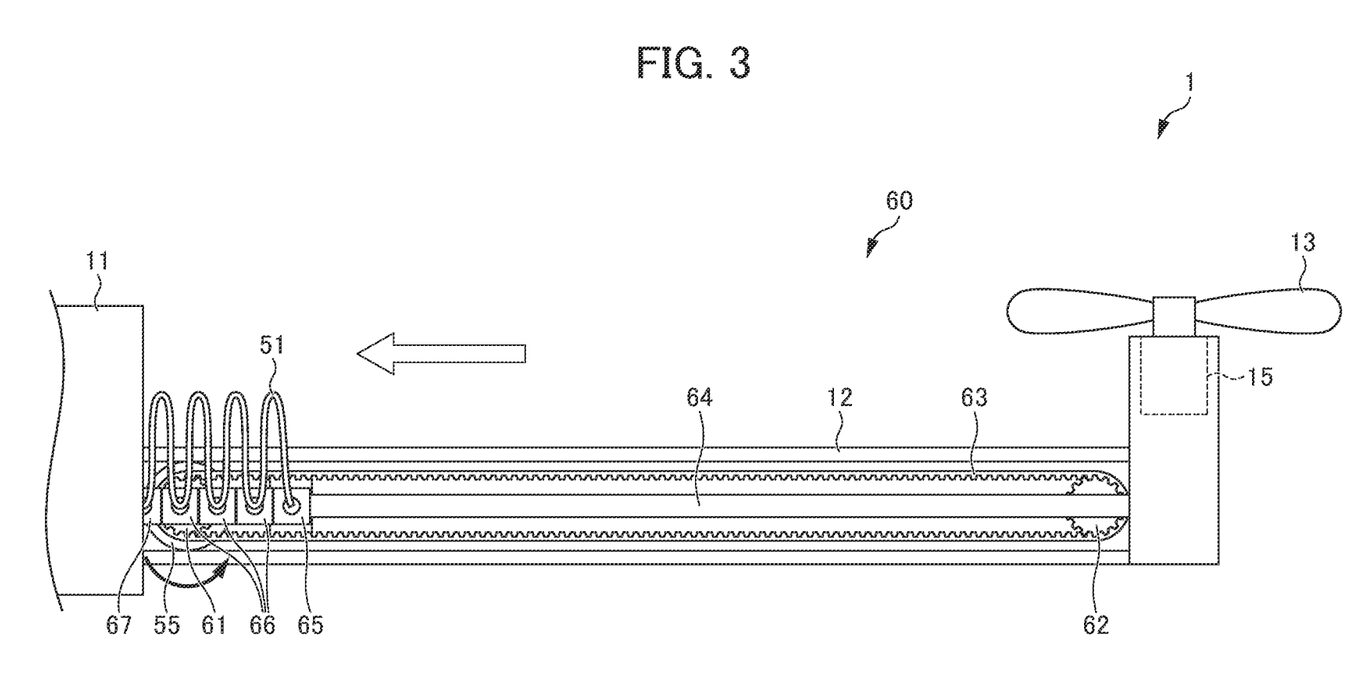
FIG. 3 is a side view showing a cloth-like part in a standby state and a configuration of a deployment mechanism in the unmanned aerial vehicle according to an embodiment.
Figure 4:
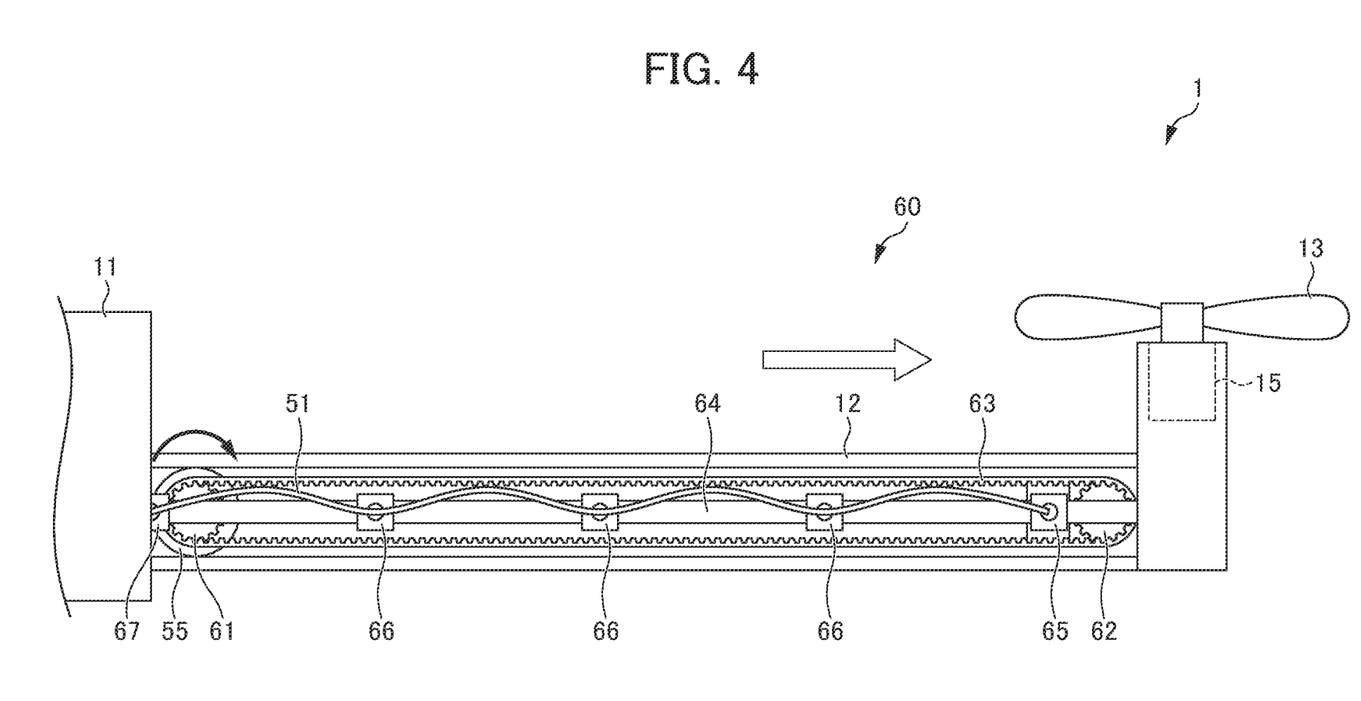
FIG. 4 is a side view showing a cloth-like part in a deployed state and a configuration of a deployment mechanism in the unmanned aerial vehicle according to an embodiment.

FIG. 3 is a side view showing the cloth-like part 51 in the standby state and the configuration of the deployment mechanism 60 in the unmanned aerial vehicle 1 of this embodiment. In FIG. 3, the hollow arrow indicates the direction in which the cloth-like part 51 is moved when switched from the deployed state to the standby state. FIG. 4 is a side view showing the cloth-like part 51 in the deployed state and the configuration of the deployment mechanism 60. In FIG. 4, the hollow arrow indicates the direction in which the cloth-like part 51 is moved when switched from the standby state to the deployed state.

As shown in FIGS. 3 and 4, the deployment mechanism 60 includes a deployment motor 55, a driving gear 61, a driven gear 62, a toothed belt 63, a rail 64, a connecting slider 65, plural driven sliders 66, and a body-fixed part 67.

The deployment motor 55 is a driving unit provided in the arm 12. The driving gear 61 is connected to the deployment motor 55. As the deployment motor 55 rotates, the driving gear 61 is rotated. In this embodiment, the deployment motor 55 is configured so that its direction and speed of rotation are controllable. For example, a stepping motor or the like is used as the deployment motor 55.

The driven gear 62 is spaced apart from the driving gear 61 in a direction away from the main body 11 and rotatably fixed with a fastener such as a bracket (not shown). The toothed belt 63 is an endless member that is engaged with and looped around the driving gear 61 and the driven gear 62. The toothed belt 63 is rotatably supported by the arm 12, having its longitudinal direction along the direction in which the arm 12 extends.

The rail 64 is provided adjacent to the toothed belt 63 and fixed to the arm 12. The rail 64 also has its longitudinal direction along the direction in which the arm 12 extends. The connecting slider 65 and the plural driven sliders 66 are slidably engaged with the rail 64.

The connecting slider 65 is disposed closer to the distal end of the arm 12 than the plural driven sliders 66. The connecting slider 65 is fixed to a distal end of the cloth-like part 51 and connected to the toothed belt 63. As the toothed belt 63 rotates, the connecting slider 65 is moved in the longitudinal direction of the arm 12 while being guided by the rail 64.

The plural driven sliders 66 are fixed to portions of the cloth-like part 51 spaced from one another. Unlike the connecting slider 65, the driven sliders 66 are not connected to the toothed belt 63. Therefore, the driven sliders 66 are not directly moved together with the rotating toothed belt 63.

The body-fixed part 67 is provided to fix a proximal end of the cloth-like part 51 to the main body 11. Thus, even when the cloth-like part 51 is switched from the standby state to the deployed state, an appropriate distance is kept between the main body 11 and the cloth-like part 51.

Referring to FIG. 3, for example, as the deployment motor 55 rotates clockwise as viewed in the drawing, the toothed belt 63 is rotated clockwise to move the connecting slider 65 rightward to a right-hand side as viewed in the drawing. As the connecting slider 65 is moved toward the distal end of the arm 12, the cloth-like part 51 is moved toward the distal end. The driven sliders 66 are pulled through the cloth-like part 51 being moved toward the distal end so that they are also moved toward the distal end along the rail 64. Since the driven sliders 66 are engaged with the cloth-like part 51, an appropriate distance is kept between the cloth-like part 51 and the arm 12 during the movement of the cloth-like part 51.

Similarly, as the deployment motor 55 rotates counterclockwise as viewed in the drawing, the connecting slider 65 is moved leftward as viewed in the drawing. As the connecting slider 65 is moved toward the main body 11 side of the arm 12, the driven sliders 66 are pushed by the connecting slider 65 and moved toward the main body 11 side. The cloth-like part 51 is smoothly folded with the aid of the creases formed in advance and turned into the standby state. During the transition from the deployed state to the standby state, an appropriate distance is kept between the cloth-like part 51 and the arm 12 by means of the driven sliders 66 engaged with the cloth-like part 51, so that the folding operation goes smoothly.

Figure 5:
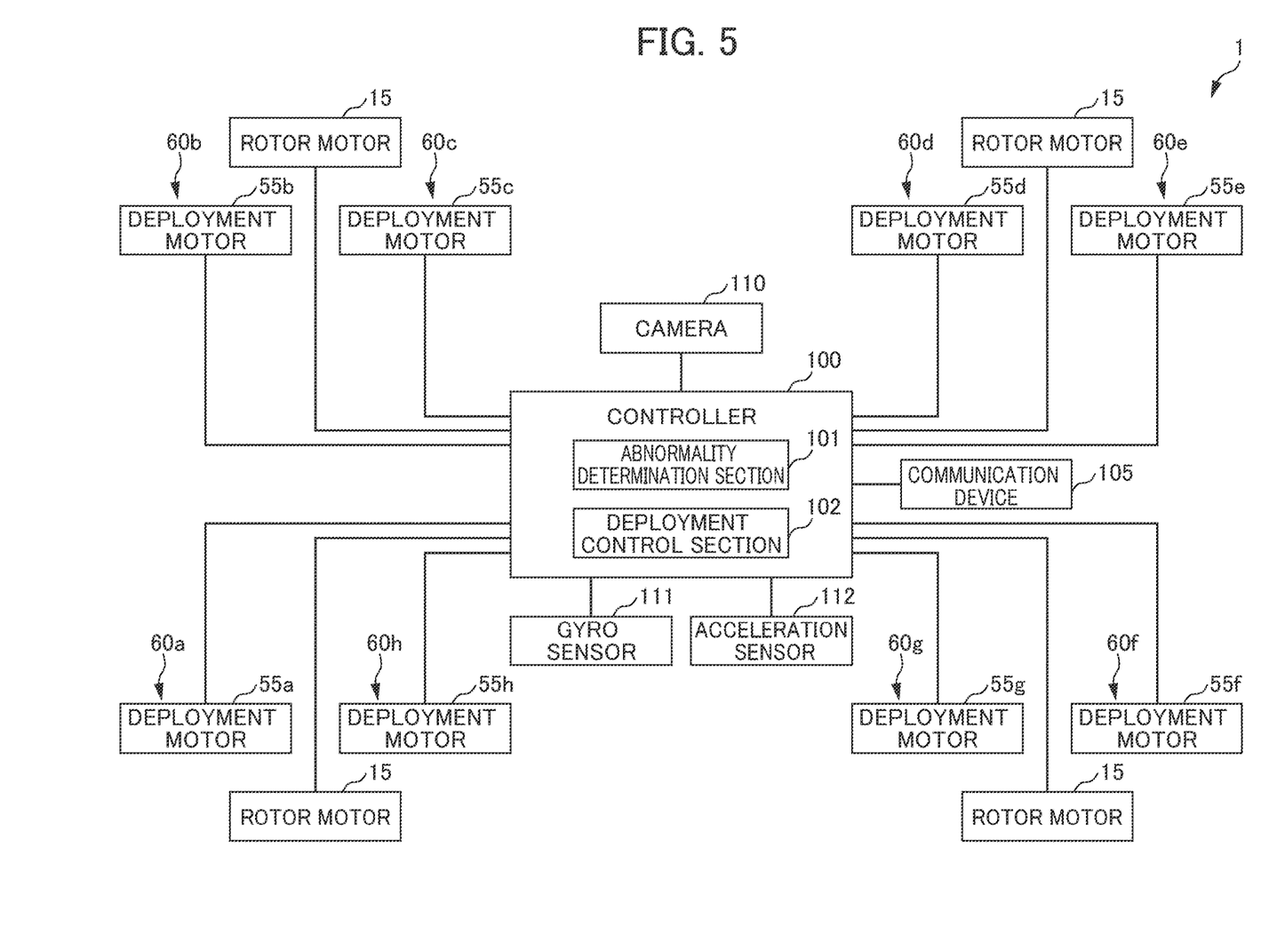
FIG. 5 is a block diagram showing an electrical configuration for deployment control in the unmanned aerial vehicle according to an embodiment.

The deployment operation by the deployment mechanisms 60a to 60 is controlled by the controller 100. FIG. 5 is a block diagram showing an electrical configuration for the deployment control in the unmanned aerial vehicle 1 of this embodiment.

The controller 100 is a computer configured to execute various control processes necessary for the flight and other operations of the unmanned aerial vehicle 1. The controller 100 is electrically connected to: detectors for detecting various pieces of information, such as a camera 110, a gyro sensor 111, and an acceleration sensor 112; a communication device 105 that transmits and receives signals to and from external devices such as an operation controller and GPS; and so on.

In this embodiment, the controller 100 includes an abnormality determination section 101 that determines whether or not any abnormality occurs in the unmanned aerial vehicle 1; and a deployment control section 102 that controls the sail deployment system 50. The abnormality determination section 101 and the deployment control section 102 are implemented by some of the programs stored in the controller 100.

The abnormality determination section 101 determines whether or not any abnormality occurs in the unmanned aerial vehicle 1 based on various pieces of information indicating abnormalities, which are input in the controller 100. Examples of abnormalities determinable by the abnormality determination section 101 include any failure or malfunction in a component of the unmanned aerial vehicle 1, such as the rotor 13, situations in which strong winds or other factors make safe flight impossible, and situations in which the remaining battery level is low after long-duration flight. The abnormalities may be of any type, and various situations may be registered as abnormalities in the controller 100.

An example of a method for determining an abnormality will be described. The abnormality determination section 101 may determine whether or not an abnormality occurs based on a detection signal from a sensor or any other component that detects the driving current through the rotor motor 15 or rotation failure of the rotor motor 15. Alternatively, the abnormality determination section 101 may determine whether or not an abnormality occurs based on information from various sensors including the camera 110, the gyro sensor 111, and the acceleration sensor 112, which indicates the flight conditions of the unmanned aerial vehicle 1. These pieces of information may be combined and used to determine whether or not an abnormality occurs.

When the user determines that it is difficult to continue the flight of the unmanned aerial vehicle 1, the occurrence of an abnormality may be determined based on information input from the outside, such as an apparatus for remotely operating the unmanned aerial vehicle 1. The abnormality determination section 101 may use various types of information to determine whether or not an abnormality occurs.

The deployment control section 102 will be described. When the abnormality determination section 101 determines that an abnormality occurs, the deployment control section 102 performs a deployment control to cause the deployment mechanisms 60a to 60h to deploy the cloth-like parts 51. Hereinafter, the control will be described with alphabetic characters attached to the reference numeral 55 for the deployment motor so that the deployment motors 55a to 55h are distinguished corresponding to the deployment mechanisms 60a to 60h.

The deployment motors 55a 55h are independently controllable. The deployment motors 55a to 55h are all configured so that their rotational direction and rate of movement are controllable, which allows control of the direction and amount of movement of the connecting slider 65.

Further, the deployment control section 102 is configured to selectively control the deployment motors 55a to 55h depending on the conditions of the unmanned aerial vehicle 1. In this embodiment, synchronized control is possible between the deployment motors 55a and 55b, between the deployment motors 55c and 55d, between the deployment motors 55e and 55f, and between the deployment motors 55g and 55h.

An example of the deployment control section 102 will be described. In this embodiment, the deployment control section 102 controls each of the deployment motors to 55h based on the abnormality determined by the abnormality determination section 101.

If the rotor motor 15 of the unmanned aerial vehicle 1 malfunctions or stops working, the unmanned aerial vehicle 1 may be allowed to fall without determining where to fall. In this case, the deployment motors 55a to 55h are driven to turn all the cloth-like parts 51a to 51e into the deployed state. In this case, as shown in FIG. 2, all the spaces between the arms 12 are filled over the circumferential direction. Where to fall may not be determined, for example, if the abnormality determination section 101 determines that the current location of the unmanned aerial vehicle 1 is in an area where there is no person, dangerous object, building, or other object at the time point when determining that an abnormality occurs.

Next, another case will be described in which the fall direction or speed is controlled if the rotor motor 15 of the unmanned aerial vehicle 1 malfunctions or stops working. The fall direction or speed may be controlled, for example, if the abnormality determination section 101 determines that the current location of the unmanned aerial vehicle 1 is in an area where there is no person or there is any dangerous object, building, or other object at the time point when determining that an abnormality occurs.

Figure 6:
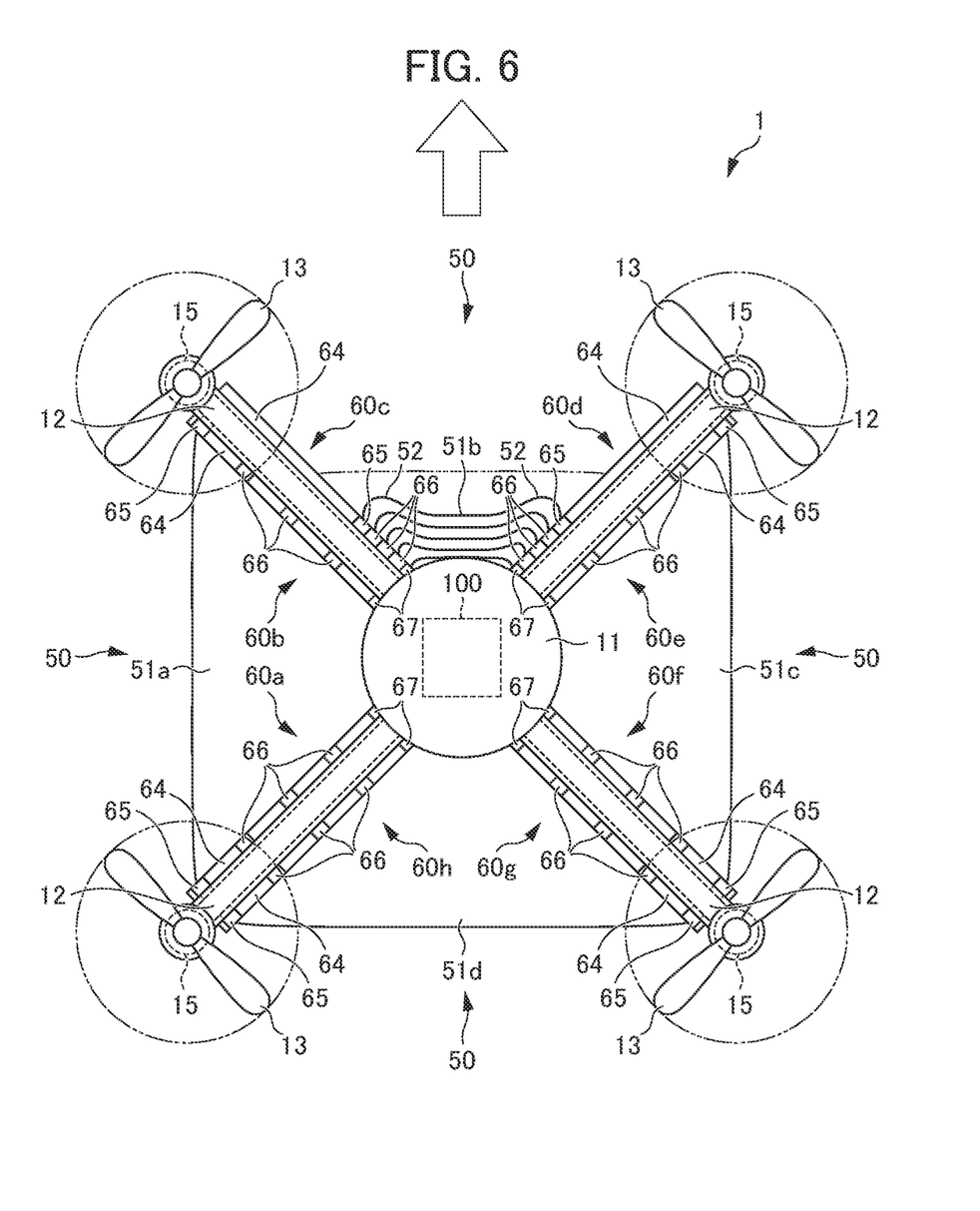
FIG. 6 is a plan view showing how cloth-like parts are deployed when the unmanned aerial vehicle according to an embodiment is in a low-speed mode.

FIG. 6 is a plan view showing how the cloth-like parts 51a to 51d are deployed when the unmanned aerial vehicle 1 according to this embodiment is in a low-speed mode. In FIG. 6, the hollow arrow indicates the direction to travel, which is upward in the drawing. As shown in FIG. 6, in the low-speed mode, the cloth-like parts 51a, 51c, and 51d are selected from the plural cloth-like parts 51a to 51d and deployed, except for the cloth-like part 51b located ahead in the direction set to travel. The cloth-like part 51b located ahead in the direction to travel is in the standby state or in a state in which the amount of deployment is smaller than that indicted by the dot-dash line. In this regard, the amount of deployment of the cloth-like part 51 may be adjusted depending on the current location and condition of the unmanned aerial vehicle 1.

When the amount of deployment of the cloth-like part 51b located ahead in the direction to travel is made smaller than the amount of deployment of the other cloth-like parts 51a, 51c, and 51d, the air resistance is made relatively small on the side located ahead in the direction to travel, so that the unmanned aerial vehicle 1 can travel in the set direction while falling.

Figure 7:
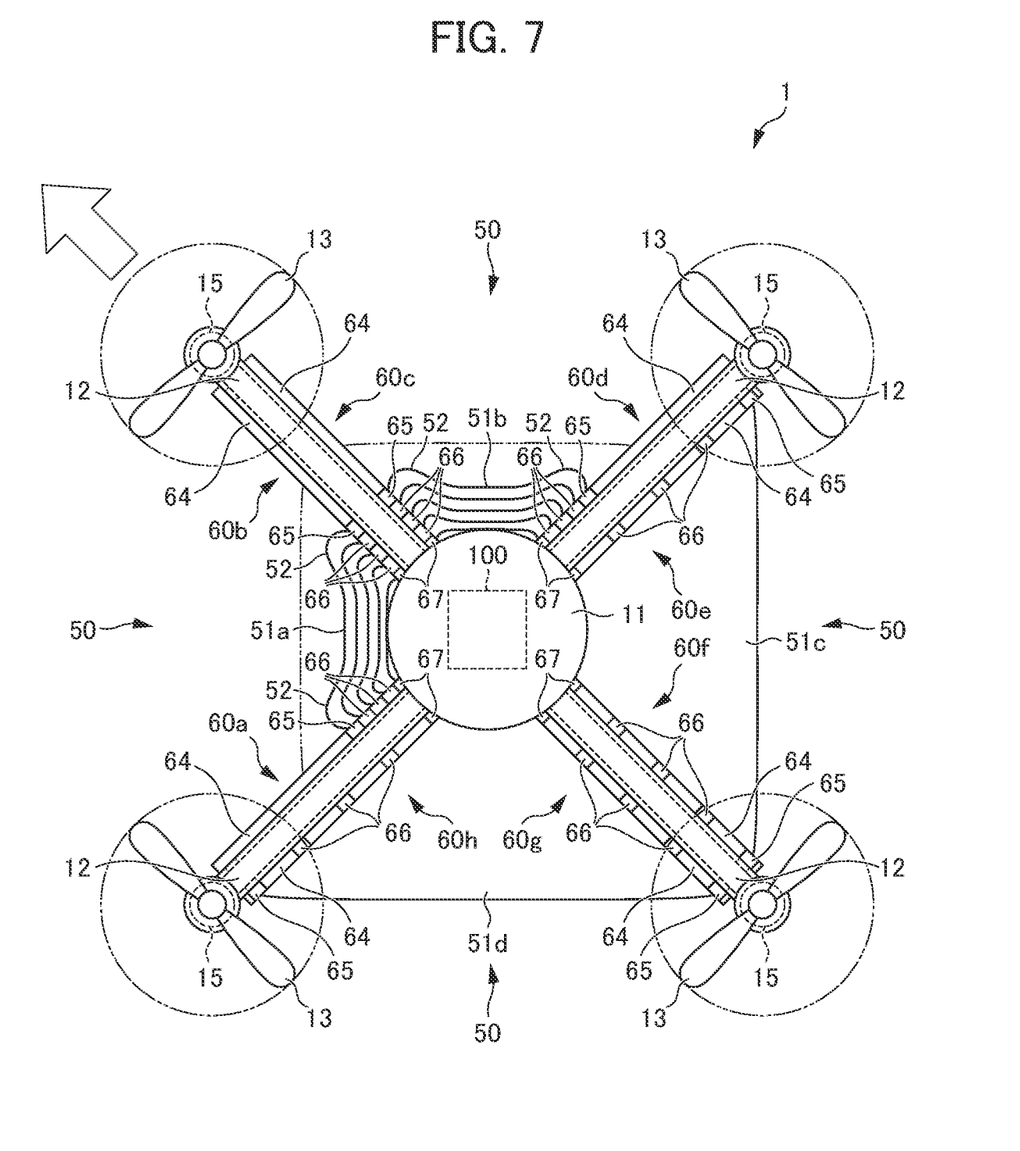
FIG. 7 is a plan view showing how cloth-like parts are deployed when the unmanned aerial vehicle according to an embodiment is in a middle-speed mode.

FIG. 7 is a plan view showing how the cloth-like parts 51a to 51d are deployed when the unmanned aerial vehicle 1 according to this embodiment is in a medium-speed mode. In FIG. 7, the hollow arrow indicates the direction to travel, which is left upward in the drawing. As shown in FIG. 7, in the medium-speed mode, the extending direction of one of the plural arms 12 is set as the direction to travel.

In the medium-speed mode, the two cloth-like parts 51c and 51d located on both sides of the arm 12 located opposite to the arm 12 located ahead in the direction to travel are in the deployed state, while the two cloth-like parts 51a and 51b located on both sides of the arm 12 located ahead in the direction to travel are in the standby state or in a state in which the amount of deployment is smaller than that indicated by the dot-dash line. In this case, the difference in air resistance between the downstream and upstream sides in the direction of travel is larger than that in the low-speed mode shown in FIG. 6, so that the unmanned aerial vehicle 1 can fall at a higher speed. In this regard, the amount of deployment of the cloth-like part 51 may be adjusted depending on the current location and condition of the unmanned aerial vehicle 1.

Figure 8:
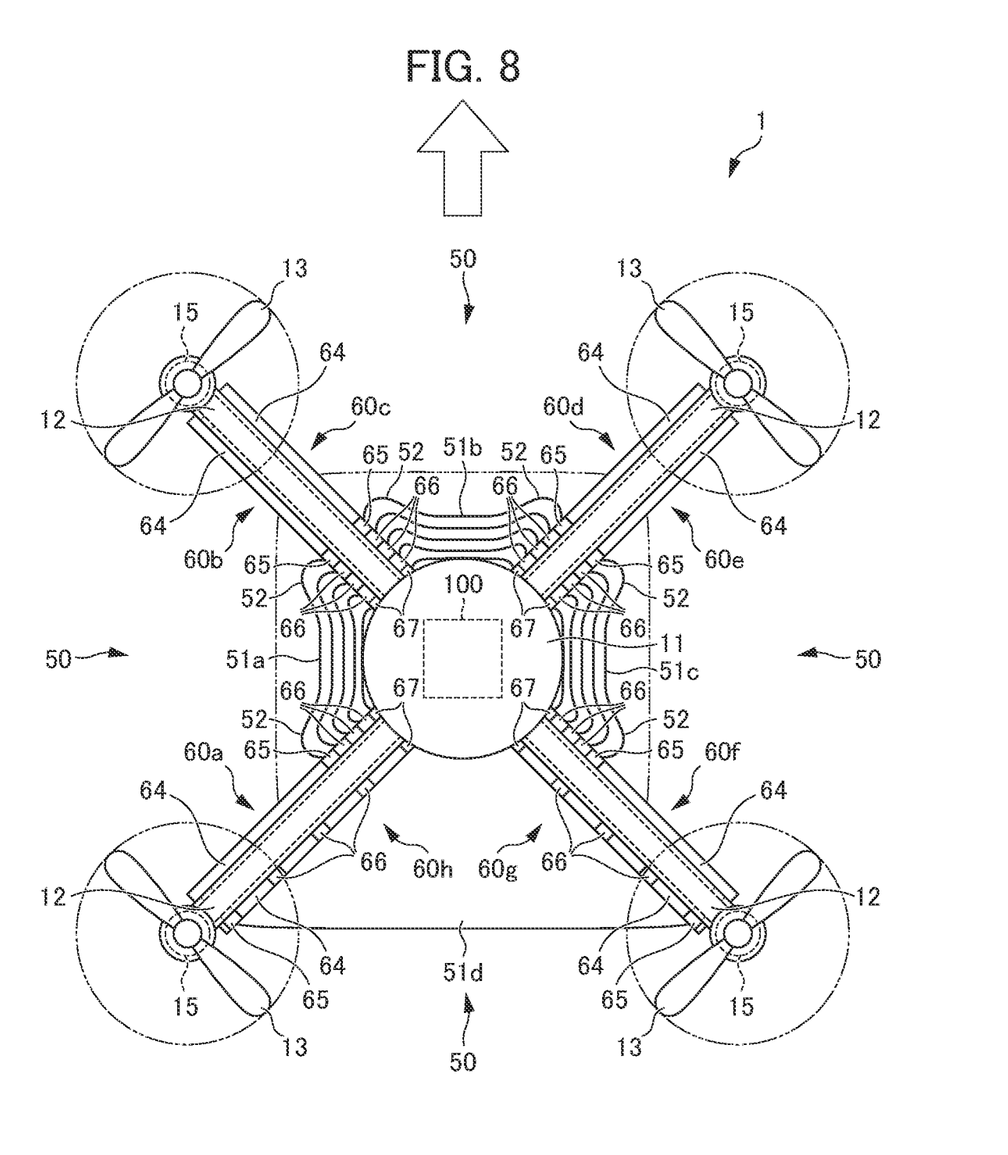
FIG. 8 is a plan view showing how cloth-like parts are deployed when the unmanned aerial vehicle according to an embodiment is in a high-speed mode.

FIG. 8 is a plan view showing how the cloth-like parts 51a to 51d are deployed when the unmanned aerial vehicle 1 according to this embodiment is in a high-speed mode. As shown in FIG. 8, in the high-speed mode, only the cloth-like part 51d located upstream in the direction of travel is in the deployed state, while the remaining cloth-like parts 51a, 51b, and 51c are in the standby state or in a state in which the amount of deployment is smaller than that indicated by the dot-dash line. In this regard, the amount of deployment of the cloth-like part 51 may be adjusted depending on the current location and condition of the unmanned aerial vehicle 1.

For example, when the unmanned aerial vehicle 1 is in an area where it should not fall on the ground, the medium- or high-speed mode may be used so that the unmanned aerial vehicle 1 is allowed to leave the area smoothly and to fall more safely.

As is apparent from the above description, each embodiment of the present invention brings about advantageous effects thanks to the features mentioned below.

An unmanned aerial vehicle (1) according to an embodiment of the present invention includes a main body (11); plural supports (12) that extend from the main body (11) and support rotors (13); cloth-like parts (51) held in a standby state in which the cloth-like parts (51) are folded at positions close to the main body (11); and deployment mechanisms (60) that are provided in the supports (12) and each configured to move a portion of the cloth-like part (51) in a direction away from the main body (11) so that the cloth-like part (51) is switched from the standby state to a deployed state in which the cloth-like part (51) is spread between the supports (12) in plan view. According to the embodiment, the cloth-like part (51) deployed between the supports (12) functions like a patagium of a flying squirrel to reduce the fall speed with wind drag applied thereon. The cloth-like part (51) stretched between the supports (12) can significantly reduce the risk of accidental contact with a tree, a building, or other objects during falling as compared to a parachute.

The unmanned aerial vehicle (1) according to an embodiment of the present invention may further includes a controller 100 serving as a control section that controls the deployment mechanisms (60) to switch the cloth-like part (51) between the standby state and the deployed state. Thus, the controller 100 enables the cloth-like part (51) to be turned into the deployed state at an appropriate time depending on the current condition of the unmanned aerial vehicle 1.

In the unmanned aerial vehicle (1) according to an embodiment of the present invention, the controller (100) may control the deployment mechanisms (60) to switch the cloth-like part (51) from the standby state to the deployed state when detecting an abnormality. According to the embodiment, when a problem such as malfunction of the rotor (13) occurs and it is determined that an abnormality occurs, the cloth-like part (51) is reliably deployed so that the unmanned aerial vehicle (1) is prevented from falling freely, which provides a further improvement in safety.

In the unmanned aerial vehicle (1) according to an embodiment of the present invention, the controller (100) may control the amount of movement in a direction in which the arm (11) extends to control the amount of deployment of the cloth-like part (51) in the deployed state. According to the embodiment, the control of the amount of deployment makes it possible to control the unmanned aerial vehicle (1) depending on conditions.

In the unmanned aerial vehicle (1) according to an embodiment of the present invention, the cloth-like parts (51a, 51b, 51c, 51d) may each be provided between a pair of the supports (12). Plural pairs of deployment mechanisms (60a and 60b, 60c and 60d, 60e and 60f, 60g and 60h) may be provided, and the number of the plural pairs of deployment mechanisms (60a and 60b, 60c and 60d, 60e and 60f, 60g and 60h) may correspond to the number of cloth-like parts (51a, 51b, 51c, and 51d). In addition, the controller (100) may selectively deploy the plural cloth-like parts (51a, 51b, 51c, 51d). According to the embodiment, the degree of deployment of the cloth-like parts (51a, 51b, 51c, 51d) can be adjusted in the circumferential direction in plan view, which allows the unmanned aerial vehicle 1 to fall at a precisely controlled speed in a precisely controlled direction. Based on dangerous area information input from the camera 110 or external information sources, it is possible to control where the unmanned aerial vehicle 1 is to fall in such a way as to avoid areas in which any person or dangerous object exists. As used herein, the phrase "selectively deploy" is intended to also include the case in which all the cloth-like parts (51a, 51b, 51c, 51d) are deployed.

In the unmanned aerial vehicle (1) according to an embodiment of the present invention, the deployment mechanism (60) may include a deployment motor (55); a driving rotary part (61) connected to the deployment motor (55); a driven rotary part (62) spaced apart from the driving rotary part (61) in a direction in which the support (12) extends; an endless member (63) looped around the driving rotary part (61) and the driven rotary part (62); and a connecting part (65) fixed to the cloth-like part (51) and fixed to the endless member (63). According to the embodiment, as the endless member (63) rotates, the cloth-like part (51) is more reliably spread and switched from the standby state to the deployed state. In addition, it is possible to more precisely control the amount of deployment. Further, as the endless member (63) rotates in the reverse direction, switching from the deployed state to the standby state is easily performed.

In the unmanned aerial vehicle (1) according to an embodiment of the present invention, the deployment mechanism (60) may further include a rail (64) which extends in a direction in which the support (12) extends and with which the connecting part (65) is slidably engaged; and plural engagement parts (66) that are slidably engaged with the rail (64) at positions closer to the main body (11) than the connecting part (65) and fixed to portions of the cloth-like part (51) spaced from one another. According to the embodiment, the cloth-like part (51) can be more smoothly spread along the direction in which the support (12) extends while a large gap is prevented from forming between the cloth-like part (51) and the support (12). In the embodiment, the phrase "the plural engagement parts fixed to portions of the cloth-like part spaced from one another" means that the engagement parts can be located at intervals in the extending direction on the cloth-like part in the deployed state.

While embodiments of the present invention have been described above, it will be understood that the embodiments are not intended to limit the present invention and may be altered or modified within the scope of the present invention as long as the object of the present invention can be achieved.

The configuration of the deployment mechanism 60 according to the embodiment may be altered or modified in any appropriate way. The deployment mechanism 60 may include a chain as the endless member and sprockets as the driving and driven rotary parts. Alternatively, the deployment mechanism 60 may include a non-toothed belt as the endless member and pulleys as the driving and driven rotary parts. Alternatively, the deployment mechanism 60 may be configured without using any endless member. Alternatively, the deployment mechanism 60 may be configured so that the deployed state is not returnable to the standby state. For example, an elastic member such as a spring, an explosive, or other means may be used for a deployment mechanism for turning the cloth-like part 51 into the deployed state.

While four cloth-like parts 51 are provided in the embodiment described above, it will be understood that such a configuration is non-limiting. Alternatively, two, three, or five or more cloth-like parts may be provided. Alternatively, a single cloth-like part may be provided below the supports to surround the periphery of the main body and configured to be radially spread when it is switched from the standby state to the deployed state.

The unmanned aerial vehicle 1 of the embodiment may include a holding part that holds the cloth-like part 51 in the standby state. The holding part may be a grip configured to grip the cloth-like part 51 in a folded state or a housing box configured to accommodate the cloth-like part in the standby state. For example, the housing box may be configured so that the cloth-like part 51 pops out of its opening when the standby state is changed to the deployed state.

While the embodiments described above show an example in which the cloth-like part 51 is spread and switched from the standby state to the deployed state when the controller 100 determines that an abnormality occurs, it will be understood that such a configuration is non-limiting. Alternatively, the cloth-like part may be turned into the deployed state even when the rotor 13 stops working.

EXPLANATION OF REFERENCE NUMERALS

1: unmanned aerial vehicle, 11: main body, 12: arm (support), 51: cloth-like part, 60: deployment mechanism, 100: controller (control section), 61: driving gear (driving rotary part), 62: driven gear (driven rotary part), 63: toothed belt (endless member), 65: connecting slider (connecting part), 66: driven slider (engagement part).

The invention claimed is:

1. An unmanned aerial vehicle comprising:
   a main body;
   a plurality of supports, each support extending from the main body and supporting a rotor;
   a cloth part held in a standby state in which the cloth part is folded at a position proximal to the main body;
   at least one deployment mechanism that is provided in a support of the plurality of supports and configured to move a portion of the cloth part in a direction away from the main body so that the cloth part is switched from the standby state to a deployed state in which the cloth part is spread between the supports in a plan view; and
   a controller that controls the deployment mechanism to switch the cloth part between the standby state and the deployed state, wherein the controller controls an amount of movement of the cloth part in a direction in which the support extends to control an amount of deployment of the cloth part in the deployed state.

2. The unmanned aerial vehicle according to claim 1, wherein
   the controller causes the deployment mechanism to switch the cloth part from the standby state to the deployed state when detecting an abnormality.

3. The unmanned aerial vehicle according to claim 1, further comprising:
   a plurality of cloth parts including the cloth part, wherein
   a cloth part of the plurality of cloth parts is provided between each pair of the supports,
   the at least one deployment mechanism includes a plurality of deployment mechanisms, and the number of the deployment mechanisms corresponds to the number of the cloth parts, and
   the controller selectively deploys the cloth parts.

4. The unmanned aerial vehicle according to claim 1, wherein
   the deployment mechanism includes:
   a deployment motor;
   a driving rotary part connected to the deployment motor;
   a driven rotary part spaced apart from the driving rotary part in a direction in which the support extends;
   an endless member looped around the driving rotary part and the driven rotary part; and
   a connecting part fixed to the cloth part and fixed to the endless member.

5. The unmanned aerial vehicle according to claim 4, wherein
   the deployment mechanism further includes:
   a rail which extends in a direction in which the support extends and with which the connecting part is slidably engaged; and
   a plurality of engagement parts that are slidably engaged with the rail at positions more proximal to the main body than the connecting part and fixed to portions of the cloth part spaced from one another.

* * * * *